United States Patent
Hamama et al.

(10) Patent No.: US 9,441,556 B2
(45) Date of Patent: Sep. 13, 2016

(54) NOISE UPDATING SYSTEMS AND METHODS

(71) Applicant: GM Global Technology Operations LLC, Detroit, MI (US)

(72) Inventors: Wajdi B. Hamama, Whitmore Lake, MI (US); Craig M. Sawdon, Williamston, MI (US); Kevin M. Luchansky, Sterling Heights, MI (US); James R. Reeder, Jr., Howell, MI (US); Frank Garthoff, Bad Duerkheim (DE); Christian Mueller, Brucken (DE); Jessica A. Carroll, Cheltenham (AU)

(73) Assignee: GM Global Technology Operations LLC, Detroit, MI (US)

( * ) Notice: Subject to any disclaimer, the term of this patent is extended or adjusted under 35 U.S.C. 154(b) by 572 days.

(21) Appl. No.: 13/832,154

(22) Filed: Mar. 15, 2013

(65) Prior Publication Data

US 2014/0278010 A1 Sep. 18, 2014

(51) Int. Cl.
*F02D 35/02* (2006.01)
*G01L 23/22* (2006.01)
*F02D 41/24* (2006.01)
*F02D 41/00* (2006.01)

(52) U.S. Cl.
CPC ......... *F02D 35/027* (2013.01); *F02D 41/2451* (2013.01); *F02D 41/0087* (2013.01); *F02D 2200/0611* (2013.01); *G01L 23/22* (2013.01)

(58) Field of Classification Search
CPC ............... F02D 35/027; F02D 35/028; F02D 41/2403; F02D 41/2451; F02D 41/0087; F02D 41/008; F02D 41/0082; F02D 41/1443; F02D 2200/0611; F02D 2200/025; G01L 23/22; G01L 23/221; G01L 23/225; G01L 23/226; G01L 23/227; F02P 5/152; F02P 5/521; F02P 5/527
USPC .............. 123/406.37, 406.38, 406.39, 198 F; 701/106, 111; 73/35.09, 35.04–6
See application file for complete search history.

(56) References Cited

U.S. PATENT DOCUMENTS

| 4,269,154 A | 5/1981 | Iwata et al. |
| 4,331,117 A | 5/1982 | Ginsburgh |
| 4,354,378 A | 10/1982 | Oshiage et al. |

(Continued)

FOREIGN PATENT DOCUMENTS

| CN | 1616811 A | 5/2005 |
| CN | 2856961 Y | 1/2007 |

(Continued)

*Primary Examiner* — Hung Q Nguyen
*Assistant Examiner* — George Jin

(57) ABSTRACT

A method includes: generating an indicator of present operating conditions of an engine; determining a first amount of noise based on vibration measured during a first plurality of combustion events of a cylinder; storing the first amount of noise and a first value of the indicator in a mapping based on a first engine speed and a first engine load; determining the first value of the indicator from the mapping based on a second engine speed and a second engine load; generating a trigger signal when the first value is different than a second value of the indicator; and, when the trigger signal is generated: determining a second amount of noise based on vibration measured during a second plurality of combustion events of the cylinder; and replacing the first amount of noise and the first value in the mapping with the second amount of noise and the second value.

20 Claims, 6 Drawing Sheets

(56) References Cited

U.S. PATENT DOCUMENTS

| | | | |
|---|---|---|---|
| 4,356,551 A | 10/1982 | Iwase et al. | |
| 4,376,429 A | 3/1983 | Youngblood | |
| 4,462,362 A | 7/1984 | Bonitz et al. | |
| 4,483,180 A | 11/1984 | Ohbuchi et al. | |
| 4,760,828 A | 8/1988 | Shimada et al. | |
| 4,770,143 A | 9/1988 | Takahashi | |
| 4,802,455 A | 2/1989 | Abo | |
| 4,821,194 A | 4/1989 | Kawamura | |
| 4,903,210 A * | 2/1990 | Akasu | 701/111 |
| 4,961,319 A | 10/1990 | Lyon | |
| 4,969,440 A | 11/1990 | Murakami et al. | |
| 5,287,837 A * | 2/1994 | Hashimoto et al. | 123/406.29 |
| 5,524,206 A | 6/1996 | Saito | |
| 5,743,233 A * | 4/1998 | Unland et al. | 123/406.37 |
| 6,230,546 B1 | 5/2001 | Wilstermann et al. | |
| 6,234,146 B1 * | 5/2001 | Tanaya et al. | 123/406.37 |
| 6,763,297 B1 * | 7/2004 | Stahl et al. | 701/111 |
| 6,947,828 B2 * | 9/2005 | Fujiwara | F02D 13/06 123/406.29 |
| 6,981,487 B2 | 1/2006 | Ohtani | |
| 7,043,353 B2 * | 5/2006 | Takemura et al. | 701/111 |
| 7,104,260 B2 | 9/2006 | Nakazawa et al. | |
| 7,246,600 B2 * | 7/2007 | Nakashima et al. | 123/435 |
| 7,526,943 B2 * | 5/2009 | Cubr et al. | 73/35.09 |
| 7,769,536 B2 | 8/2010 | Hamama et al. | |
| 8,364,377 B2 | 1/2013 | Hacker et al. | |
| 8,478,511 B2 | 7/2013 | Hamama et al. | |
| 8,538,666 B2 | 9/2013 | Buslepp et al. | |
| 2004/0030486 A1 * | 2/2004 | Sauler et al. | 701/111 |
| 2005/0098156 A1 | 5/2005 | Ohtani | |
| 2006/0021422 A1 * | 2/2006 | Demura et al. | 73/35.01 |
| 2006/0122765 A1 * | 6/2006 | Nakao et al. | 701/111 |
| 2006/0124107 A1 * | 6/2006 | Sauler et al. | 123/406.29 |
| 2006/0207555 A1 * | 9/2006 | Ito et al. | 123/406.47 |
| 2007/0028893 A1 | 2/2007 | Hernandez | |
| 2007/0215111 A1 * | 9/2007 | Surnilla | 123/431 |
| 2007/0277780 A1 * | 12/2007 | Akazaki et al. | 123/406.22 |
| 2008/0276689 A1 | 11/2008 | Tanaya et al. | |
| 2008/0312810 A1 * | 12/2008 | Nonoyama | 701/111 |
| 2009/0043484 A1 * | 2/2009 | Yoshihara et al. | 701/111 |
| 2009/0211337 A1 * | 8/2009 | Masuda et al. | 73/35.09 |
| 2009/0276147 A1 | 11/2009 | Hamama et al. | |
| 2010/0138135 A1 * | 6/2010 | Hacker et al. | 701/102 |
| 2011/0118960 A1 * | 5/2011 | Komatsu et al. | 701/111 |
| 2011/0178750 A1 * | 7/2011 | Kitamura et al. | 702/76 |
| 2011/0265454 A1 * | 11/2011 | Smith et al. | 60/274 |
| 2011/0276293 A1 * | 11/2011 | Kitamura et al. | 702/76 |
| 2012/0048234 A1 * | 3/2012 | Hamama et al. | 123/436 |
| 2012/0080008 A1 * | 4/2012 | Matsushima et al. | 123/436 |
| 2012/0285161 A1 * | 11/2012 | Kerns et al. | 60/598 |
| 2014/0278010 A1 | 9/2014 | Hamama et al. | |

FOREIGN PATENT DOCUMENTS

| | | |
|---|---|---|
| CN | 101019013 A | 8/2007 |
| CN | 101675235 A | 3/2010 |
| DE | 102007051784 A1 | 11/2008 |
| DE | 102009001188 A1 | 9/2009 |
| EP | 1531324 B1 * | 12/2011 |
| JP | 2004270626 A | 9/2004 |
| WO | WO-2007001040 A1 | 1/2007 |

* cited by examiner

NOISE UPDATING SYSTEMS AND METHODS

FIELD

The present disclosure relates to internal combustion engines and more particularly to knock detection systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to produce drive torque. In some engines, the cylinders may be arranged in two separate banks of cylinders. A vibration sensor may be included with each bank of the cylinders. A vibration sensor measures vibration of the engine. For example only, the vibration sensor may include a piezoelectric accelerometer.

An analog to digital (ND) converter may digitize an output of the vibration sensor. A digital signal processor (DSP) may perform a Fast Fourier Transform (FFT) on the digitized output to identify a frequency content of the digitized output. Whether knock is occurring may be determined based upon the frequency content of the digitized output.

SUMMARY

In a feature, a condition module generates an indicator of present operating conditions of an engine based on at least one of an engine temperature, fueling of the engine, an amount of ethanol in the fuel, and a number of deactivated cylinders of the engine. A noise module determines a first amount of noise based on vibration measured during a first plurality of combustion events of a cylinder and stores the first amount of noise and a first value of the indicator of the present operating conditions in a mapping based on a first engine speed and a first engine load. A triggering module determines the first value of the indicator from the mapping based on a second engine speed and a second engine load and generates a trigger signal when the first value is different than a second value of the indicator. When the trigger signal is generated, the noise module: determines a second amount of noise based on vibration measured during a second plurality of combustion events of the cylinder occurring after the first plurality of combustion events; and replaces the first amount of noise and the first value in the mapping with the second amount of noise and the second value.

In further features, a knock determination module determines a knock value for a combustion event of the cylinder occurring after the second plurality of combustion events based on vibration measured during the combustion event of the cylinder and based on the second amount of noise. A knock diagnostic module selectively diagnoses knock in the cylinder based on the knock value and a predetermined knock value.

In still further features, a spark control module retards a spark timing when knock is diagnosed.

In yet further features, the knock diagnostic module diagnoses knock in the cylinder when the knock value is greater than the predetermined knock value.

In further features, the knock determination module sets the knock value for the combustion event based on an intensity of the vibration measured during the combustion event of the cylinder divided by the second amount of noise.

In still further features, the condition module generates the indicator based on whether the engine temperature is less than a predetermined temperature.

In yet further features, the condition module generates the indicator based on whether the engine temperature is greater than a predetermined temperature.

In further features, the condition module generates the indicator based on whether at least one cylinder of the engine is deactivated.

In still further features, a fuel control module selectively provides fuel for a combustion event of the cylinder occurring after the plurality of combustion events using at least two fuel injections. The condition module generates the indicator based on whether fuel is being provided to the cylinder using at least two fuel injections.

In yet further features, the condition module generates the indicator based on whether the fueling of the engine is richer than stoichiometry by at least a predetermined amount.

In a feature, a method includes: generating an indicator of present operating conditions of an engine based on at least one of an engine temperature, fueling of the engine, an amount of ethanol in the fuel, and a number of deactivated cylinders of the engine; determining a first amount of noise based on vibration measured during a first plurality of combustion events of a cylinder; storing the first amount of noise and a first value of the indicator of the present operating conditions in a mapping based on a first engine speed and a first engine load; determining the first value of the indicator from the mapping based on a second engine speed and a second engine load; and generating a trigger signal when the first value is different than a second value of the indicator. The method further includes, when the trigger signal is generated: determining a second amount of noise based on vibration measured during a second plurality of combustion events of the cylinder occurring after the first plurality of combustion events; and replacing the first amount of noise and the first value in the mapping with the second amount of noise and the second value.

In further features, the method further includes: determining a knock value for a combustion event of the cylinder occurring after the second plurality of combustion events based on vibration measured during the combustion event of the cylinder and based on the second amount of noise; and selectively diagnosing knock in the cylinder based on the knock value and a predetermined knock value.

In still further features, the method further includes retarding a spark timing when knock is diagnosed.

In yet further features, the method further includes diagnosing knock in the cylinder when the knock value is greater than the predetermined knock value.

In further features, the method further includes setting the knock value for the combustion event based on an intensity of the vibration measured during the combustion event of the cylinder divided by the second amount of noise.

In still further features, the method further includes generating the indicator based on whether the engine temperature is less than a predetermined temperature.

In yet further features, the method further includes generating the indicator based on whether the engine temperature is greater than a predetermined temperature.

In further features, the method further includes generating the indicator based on whether at least one cylinder of the engine is deactivated.

In still further features, the method further includes: selectively providing fuel for a combustion event of the cylinder occurring after the plurality of combustion events using at least two fuel injections; and generating the indicator based on whether fuel is being provided to the cylinder using at least two fuel injections.

In yet further features, the method further includes generating the indicator based on whether the fueling of the engine is richer than stoichiometry by at least a predetermined amount.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts a mixture of air and fuel within cylinders to generate drive torque for a vehicle. A knock detection system of the vehicle selectively diagnoses knock within the cylinder based on vibration measured during a combustion event of the cylinder.

However, in addition to including vibration associated with knock, the vibration measured during the combustion event of the cylinder also includes vibration that is not associated with knock, such as vibration from one or more other cylinders, vibration from other components of the vehicle, and vibration from other sources. Vibration measured during a combustion event of a cylinder that is not attributable to knock within the cylinder may be referred to as background noise.

The knock detection system determines an amount of background noise for each of a plurality of engine speed and engine load conditions based on vibration measured during operation under each of the engine speed and load conditions. For a given combustion event of the cylinder, the knock detection system determines a knock value based on vibration measured during the combustion event and the background noise associated with the present engine speed and engine load conditions. The knock detection system selectively diagnoses knock in the cylinder based on the knock value.

The knock detection system determines the background noise based on the present engine speed and engine load conditions. More specifically, the knock detection system determines the background noise using a mapping that relates engine speeds and engine loads to background noise.

However, even at approximately constant engine speed and load conditions, background noise may vary as one or more other operating conditions change. For example, background noise vary with engine temperature (e.g., engine hot or engine cold), an amount of ethanol in fuel provided to the engine, fuel injection type (e.g., single injection or multiple injections), mixture of air and fuel provided to the engine, and/or number of deactivated cylinders. This variation may prevent the knock detection system from identifying knock when knock is present or cause the knock detection system to identify knock when knock is not present.

The knock detection system therefore stores the other operating conditions when each of the background noise values are determined. When the present operating conditions are different than the stored operating conditions associated with the background noise corresponding to the present engine speed and load conditions, the knock detection system updates the background noise in the mapping with a new value of the background noise and the present operating conditions. The knock detection system determines the new value of the background noise based on vibration measured during combustion events of the cylinder under the present operating conditions.

Figure 1:
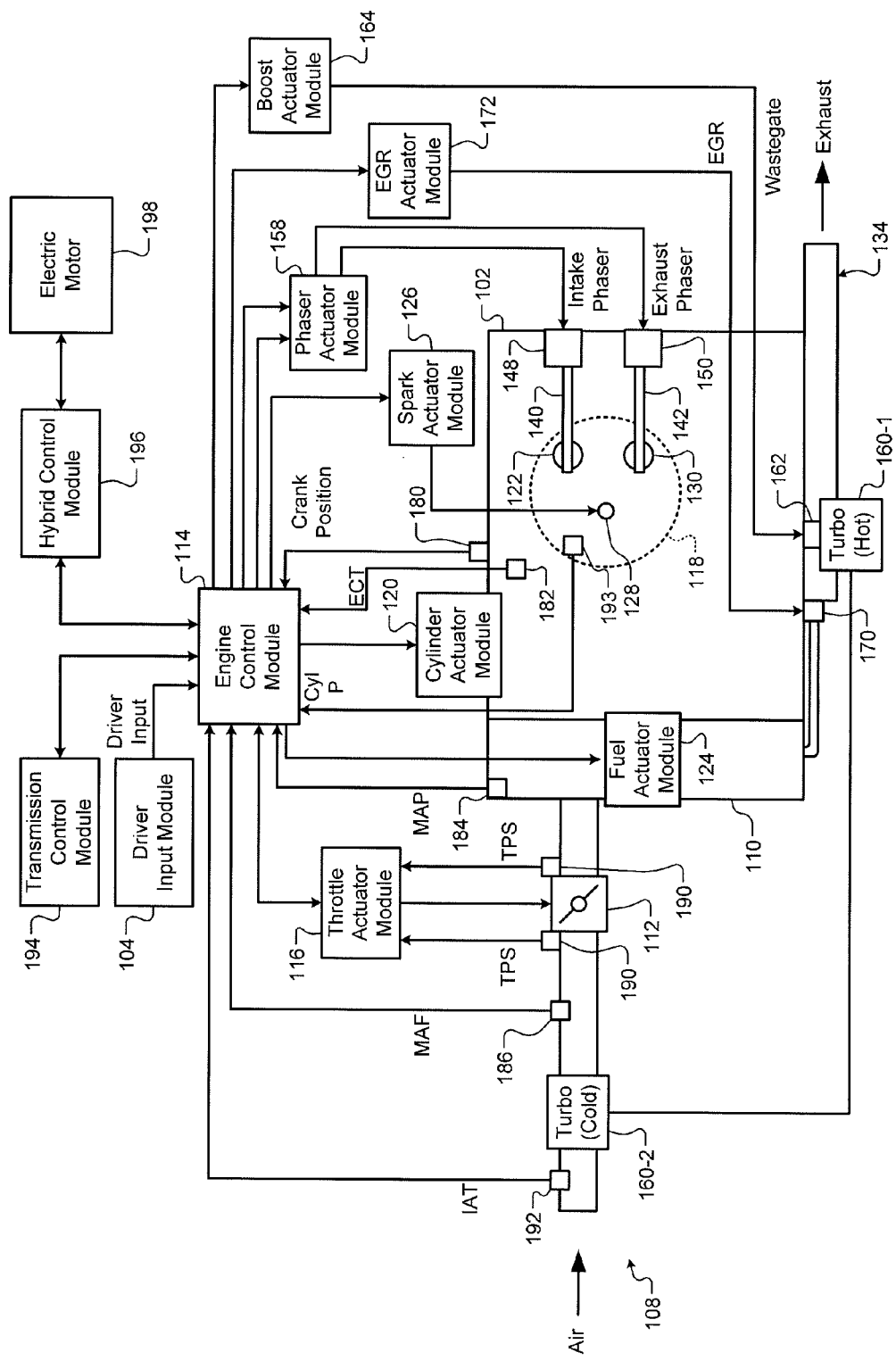
FIG. 1 is a functional block diagram illustrating an example engine control system.

Referring now to FIG. 1, a functional block diagram of an example engine system is presented. The engine system includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control the amount of air drawn into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. Under some circumstances, the ECM 114 may instruct a cylinder actuator module 120 to selectively deactivate one or more of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. The intake camshaft 140 may also control the intake valves of other cylinders of a first cylinder bank including the cylinder 118. The intake camshaft 140 or a second intake camshaft (not shown) may control the intake valves of cylinders of a second cylinder bank.

The exhaust camshaft 142 may control the exhaust valves of the other cylinders of the first cylinder bank. The exhaust camshaft 142 or a second exhaust camshaft may control the exhaust valves of the cylinders of the second cylinder bank. The cylinder actuator module 120 may deactivate the cylinder 118 by disabling opening of the intake valve 122 and/or the exhaust valve 130.

An intake cam phaser 148 selectively adjusts rotation of the intake camshaft 140 relative to rotation of the crankshaft. Adjusting the rotation of the intake camshaft 140 adjusts opening and closing timing of the intake valve 122. A second intake cam phaser (not shown) may selectively adjust rotation of the second intake camshaft relative to rotation of the crankshaft.

An exhaust cam phaser 150 selectively adjusts rotation of the exhaust camshaft 142 relative to rotation of the crankshaft. Adjusting the rotation of the exhaust camshaft 142 adjusts opening and closing timing of the exhaust valve 130. A second exhaust cam phaser (not shown) may selectively adjust rotation of the second exhaust camshaft relative to rotation of the crankshaft.

A phaser actuator module 158 controls the intake cam phaser 148 and the exhaust cam phaser 150 based on signals from the ECM 114. When implemented, variable valve lift (not shown) may also be controlled by the phaser actuator module 158. The phaser actuator module 158 may also control the second intake and exhaust cam phasers based on signals from the ECM 114. While camshaft-based valve actuation is shown and discussed, camless valve actuation may be implemented.

The engine system may include a boost device that provides pressurized air to the intake manifold 110. For example, FIG. 1 shows a turbocharger including a turbine 160-1 that is powered by exhaust gases flowing through the exhaust system 134. The turbocharger also includes a compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110. An intercooler (not shown) may dissipate some of the heat contained in the compressed air charge, which is generated as the air is compressed. The compressed air charge may also have absorbed heat from components of the exhaust system 134.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

The engine system may include an exhaust gas recirculation (EGR) valve 170, which selectively redirects exhaust gas back to the intake manifold 110. The EGR valve 170 may be located upstream of the turbine 160-1. The EGR valve 170 may be controlled by an EGR actuator module 172 based on signals from the ECM 114.

A position of the crankshaft may be measured using a crankshaft position sensor 180. An engine speed, for example in revolutions per minute (RPM), may be generated based on the position of the crankshaft. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which may refer to a difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. A pressure within the cylinder 118 may be measured using a cylinder pressure sensor 193. A cylinder pressure sensor may be provided for each cylinder. One or more other sensors may also be implemented. For example, the engine system may include an oil temperature sensor, an engine (block) temperature sensor, and/or one or more other suitable vehicle sensors. The ECM 114 may use signals from the sensors to make control decisions for the engine system.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Figure 2:
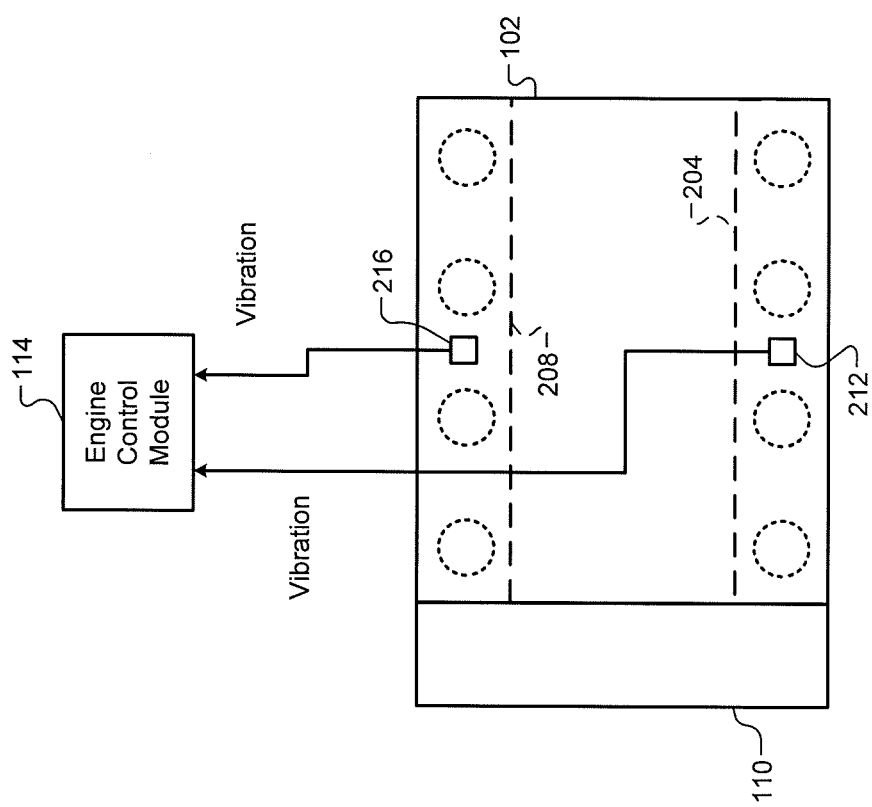
FIG. 2 is a functional block diagram further illustrating the example engine control system.

Referring now to FIG. 2, a functional block diagram of an example engine system is presented. The cylinders of the engine 102 may be arranged in one or more banks (also called cylinder banks). For example, in the example of FIG. 2, a first sub-set (e.g., one half) of the cylinders may be arranged in a first bank 204 and a second sub-set (e.g., the other half) of the cylinders may be arranged in a second bank 208 of cylinders. In-line type engines may include a single bank of cylinders. V and W type engines may include multiple cylinder banks.

A vibration sensor may measure vibration of a bank of cylinders. For example, a first vibration sensor 212 may measure vibration of the first bank 204, and a second vibration sensor 216 may measure vibration of the second bank 208. While two banks of cylinders and two vibration sensors are shown, the engine 102 may include one or more banks of cylinders and one or more vibration sensors. In various implementations, one vibration sensor may be provided for each cylinder, each pair of cylinders, etc.

The ECM 114 diagnoses knock in a cylinder based on vibration measured during a predetermined knock window of the cylinder. One or more engine operating parameters may be adjusted when knock is diagnosed. For example, the ECM 114 may retard spark timing (relative to when knock is not present) when knock is diagnosed. One or more other engine operating parameters may also be adjusted when knock is diagnosed, such as fueling, EGR, boost, etc.

Figure 3:
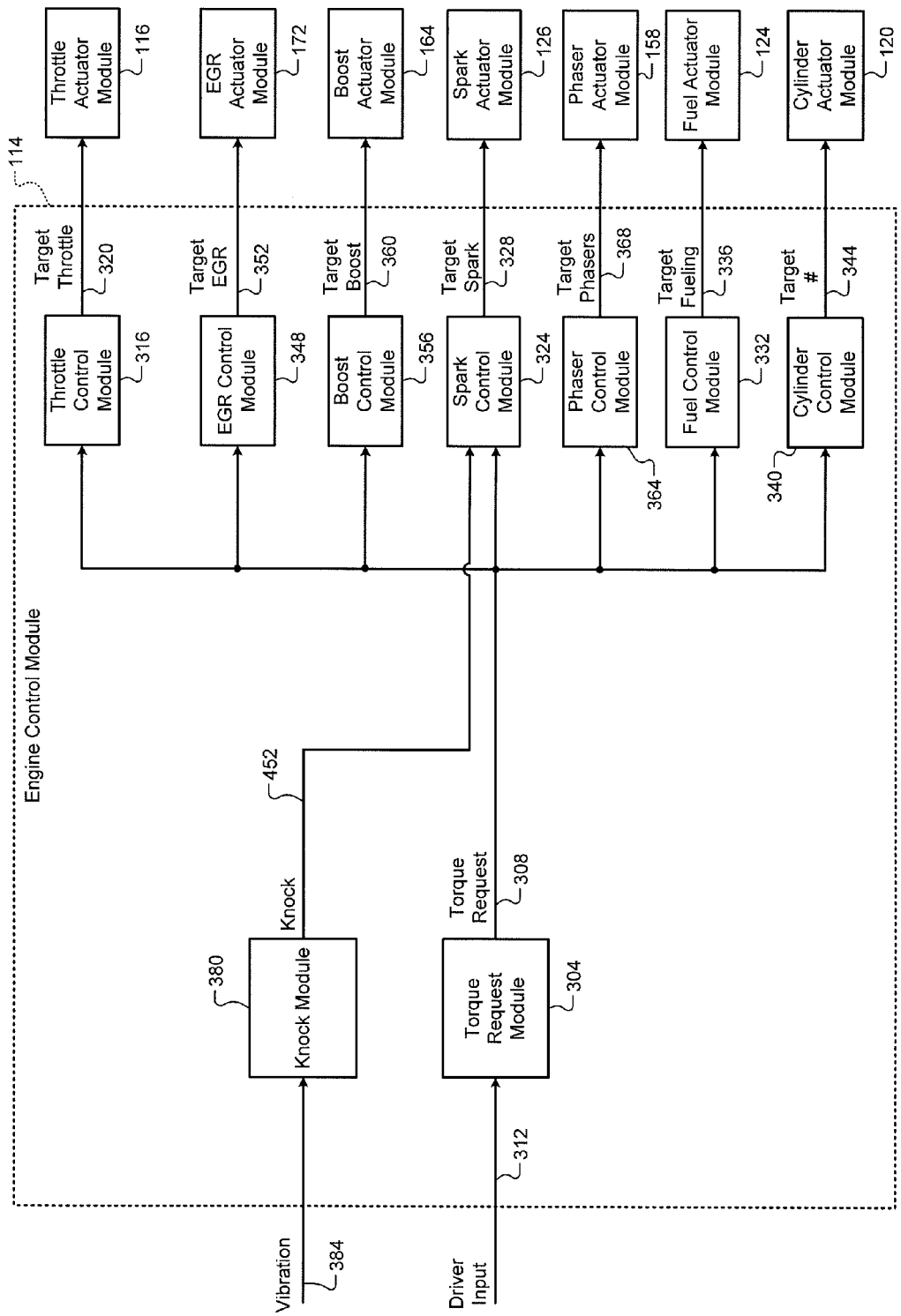
FIG. 3 is a functional block diagram of an example engine control module according to the present disclosure.

Referring now to FIG. 3, a functional block diagram of an example implementation of the ECM 114 is presented. A torque request module 304 may determine a torque request 308 based on one or more driver inputs 312, such as an accelerator pedal position, a brake pedal position, a cruise control input, and/or one or more other suitable driver inputs. The torque request module 304 may determine the torque request 308 additionally or alternatively based on one or more other torque requests, such as torque requests generated by the ECM 114 and/or torque requests received from other modules of the vehicle, such as the transmission control module 194, the hybrid control module 196, a chassis control module, etc. One or more engine actuators may be controlled based on the torque request 308 and/or one or more other vehicle operating parameters.

For example, a throttle control module 316 may determine a target throttle opening 320 based on the torque request 308. The throttle actuator module 116 may adjust opening of the throttle valve 112 based on the target throttle opening 320. A spark control module 324 may determine a target spark timing 328 based on the torque request 308. The spark actuator module 126 may generate spark based on the target spark timing 328.

A fuel control module 332 may determine one or more target fueling parameters 336 based on the torque request 308. For example, the target fueling parameters 336 may include number of fuel injection pulses (per combustion event), timing for each pulse, and amount for each pulse. The fuel actuator module 124 may inject fuel based on the target fueling parameters 336.

A cylinder control module 340 may determine a target number of cylinders to deactivate and/or deactivate 344 based on the torque request 308. The cylinder actuation module 120 may activate and deactivate cylinders of the engine 102 based on the target number 344. An EGR control module 348 may determine a target EGR opening 352 for the EGR valve 170 based on the torque request 308. The EGR actuator module 172 may control the EGR valve 170 based on the target EGR opening 352.

A boost control module 356 may determine a target boost 360 based on the torque request 308. The boost actuator module 164 controls boost based on the target boost 360. For example, the boost actuator module 164 may control the wastegate 162 on the target boost 360. A phaser control module 364 may determine target intake and exhaust cam phaser angles 368 based on the torque request 308. The phaser actuator module 158 controls the intake and exhaust cam phasers 148 and 150 based on the target intake and exhaust cam phaser angles 368, respectively.

A knock module 380 (see also FIG. 4) determines whether knock occurred within a cylinder based on vibration 384 measured using a vibration sensor during a predetermined knock window of a combustion event of the cylinder. The knock module 380 determines an intensity value for the combustion event of the cylinder based on the vibration 384 measured during the predetermined knock window.

The knock module 380 learns an amount of background noise for combustion events of the cylinder. The amount of background noise may include vibration from sources other than knock, such as vibration produced by other cylinders. The knock module 380 determines a knock value for the combustion event of the cylinder based on the intensity value and the amount of background noise.

The amount of background noise, however, may vary under some circumstances. If the background noise is learned when the background noise is high and a transition occurs to operation with lower background noise, the knock module 380 may determine that knock did not occur when knock did in fact occur. Conversely, if the background noise is learned when the background noise is low and a transition occurs to operation with higher background noise, the knock module 380 may falsely determine that knock occurred within the cylinder due to the increased background noise. The knock module 380 therefore re-learns the background noise when a change occurs that may cause a change in the background noise.

Figure 4:
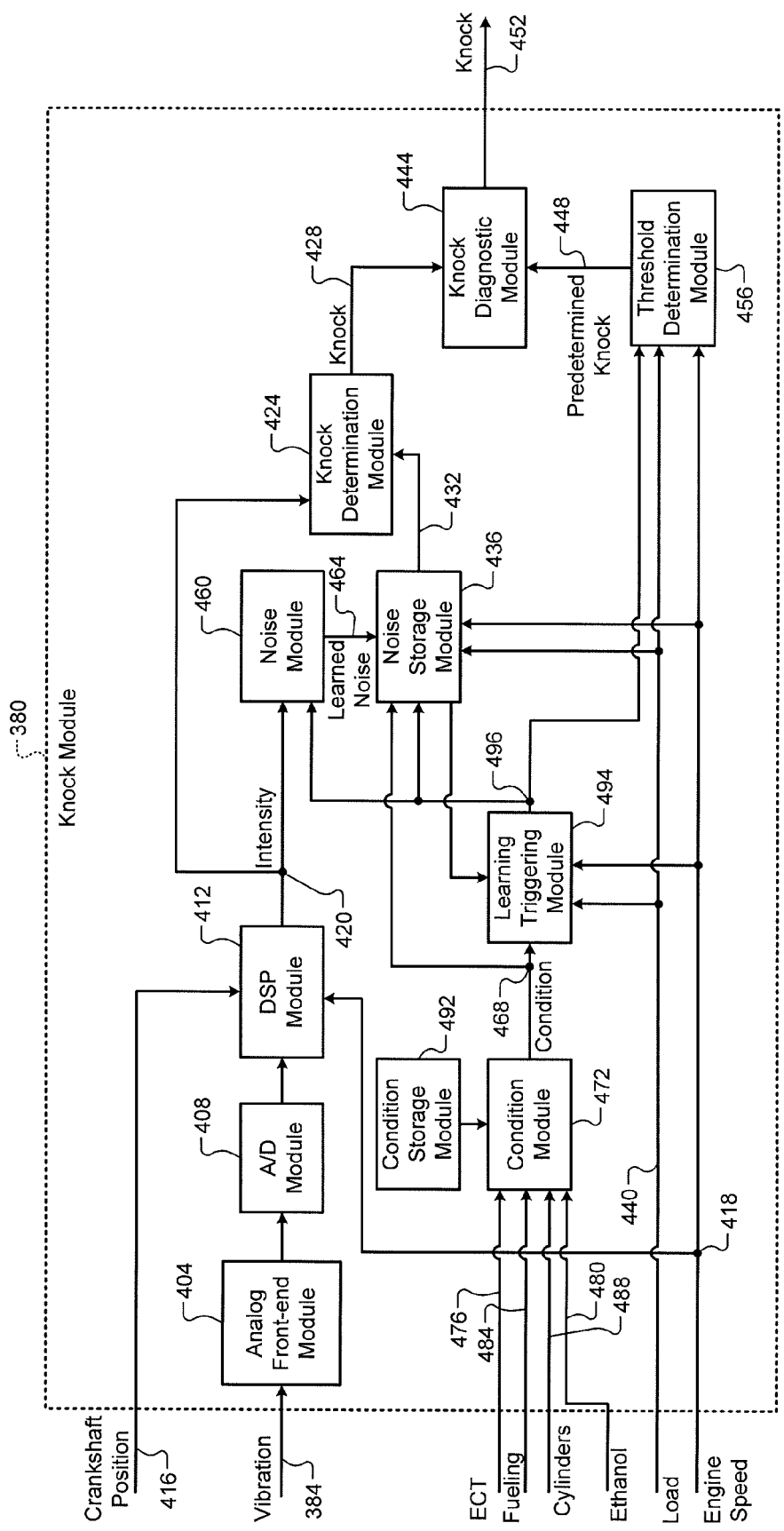
FIG. 4 is a functional block diagram of an example knock module according to the present disclosure.

Referring now to FIG. 4, a functional block diagram of an example implementation of the knock module 380 is presented. The cylinders of the engine 102 are addressed for firing in a predetermined firing order. Firing timing may refer to the timing of ignition of the air/fuel mixture (e.g., spark timing).

Each of the cylinders of the engine 102 may be assessed for knock. An analog front-end module 404 may select between signals from multiple vibration sensors based on which one of the cylinders is being assessed. For example, when assessing one of the cylinders ("the cylinder") for knock, the analog front-end module 404 may select the signal from a vibration sensor that is located in a cylinder bank including the cylinder. If multiple vibration sensors are present in the cylinder bank, the analog front-end module 404 may select the vibration sensor that is located closest to the cylinder. While knock analysis and detection will be discussed in terms of the (one) cylinder, the knock analysis and detection described herein may be performed similarly or identically for each other cylinder of the engine 102.

Knock associated with the cylinder may occur during the combustion stroke of the cylinder. A predetermined window surrounding the firing timing of a combustion event of the cylinder may be referred to as the cylinder's knock window. A vibration profile of the cylinder is measured by the selected vibration sensor during the cylinder's knock window.

The analog front-end module 404 may include a differential input circuit. The differential input circuit may convert a differential input from the selected vibration sensor into a single output. The analog front-end module 404 may apply one or more (analog) filters to the output of the differential input circuit, such as a first-order filter with a low-pass cut-off frequency of 25 kHz. The analog front-end module 404 may also amply one or more scalars to amplify or attenuate an output of the one or more filters.

An output of the analog front-end module 404 is transmitted to an analog-to-digital (ND) converter module 408. The ND converter module 408 samples the output of the analog front-end module 404 and digitizes the samples to produce digital values. The A/D converter module 408 outputs the digital values to a digital signal processor (DSP) module 412.

The DSP module 412 may apply a digital filter to the received signal. For example, the DSP module 412 may implement a fourth-order elliptic infinite impulse response (IIR) digital filter with a cut-off frequency of 20 kHz. Alternatively, the DSP module 412 may implement two second-order IIR filters in series to improve stability or apply one or more other digital filters to the received signal.

The DSP module 412 performs at least one Fast Fourier Transform (FFT) based on digital values from during the cylinder's knock window to generate FFT data for the combustion event. The knock window for the cylinder may be defined in terms of rotational degrees of the crankshaft. In other words, the knock window for the cylinder may correspond to a predetermined range of crankshaft positions 416 measured using the crankshaft position sensor 180. The knock window may be fixed or may be varied based upon an engine speed 418 and/or one or more other engine operating parameters. The engine speed 418 may be determined based on the crankshaft position 416.

If the time (period) elapsed during the knock window of a combustion event is long enough, such as at low engine speeds, the DSP module 412 may collect enough data to perform multiple FFTs during the knock window. If data for a last one of multiple FFTs is only partially gathered when the knock window ends, the data may be zero padded (i.e., padded with values indicative of zero vibration). Alternatively, data from one or more previous FFTs may be used to complete a data set for the last FFT.

If knock windows for different cylinders are allowed to overlap, the knock module 380 may include an additional analog front-end module, an additional ND converter module, and an additional DSP module to capture and analyze data within the knock windows in parallel. If the DSP module 412 has sufficient processing capacity, the DSP module 412 may be able to process data from overlapping knock windows without an additional DSP module. A buffer may then be included between the A/D converter modules and the DSP module 412 to store the data for use by the DSP module 412.

The DSP module 412 generates an intensity value 420 for the combustion event of the cylinder based on the FFT data for the combustion event. As described above, one or more FFTs may be performed during the knock window of the cylinder. The number of FFTs performed may depend upon the time elapsed during the knock window. Each FFT may provide a predetermined number of FFT points, such as 128 FFT points or another suitable number of FFT points. Portions of each FFT may be truncated in various implementations, such as by removing the last 64 points of each FFT.

One or more predetermined ranges of points of interest may be defined for each of the FFTs. For example, three predetermined ranges of interest may be defined for each of the received FFTs. The predetermined ranges may be set based upon, for example, the engine speed 418. Because FFTs are in the frequency domain, a predetermined range of FFT points of interest correspond to a predetermined frequency range of interest.

Within each of the predetermined ranges, the DSP module 412 may determine a single intensity value. For example, the DSP module 412 may select the maximum intensity FFT point within each predetermined range or determine an average of the FFT points within each predetermined range.

The DSP module 412 may select one of the predetermined ranges for generating the intensity value 420. For example, the DSP module 412 may select one of the predetermined ranges based on the engine speed 418. Because each range has been reduced to a single value, selecting a range can reduce the entire FFT to a single value. The DSP module 412 may select one of the predetermined ranges, for example, based on the engine speed 418 or based on the one of the predetermined ranges with the largest single intensity value. The DSP module 412 may use the single intensity value of the selected one of the predetermined ranges as the intensity value 420 or determine the intensity value 420 based on the single intensity value of the selected one of the predetermined ranges.

A knock determination module 424 determines a knock value 428 for the combustion event of the cylinder based on the intensity value 420 for the combustion event. While the intensity value 420 represents an amount of vibration that is associated with knock, the intensity value 420 may also include background noise. The knock determination module 424 may therefore determine the knock value 428 further based on an amount of background noise 432.

A noise storage module 436 determines the amount of background noise 432 for the combustion event of the cylinder based on the engine speed 418 and an engine load 440 during the combustion event. The noise storage module 436 determines the amount of background noise 432 using a mapping (e.g., table) that relates the engine speed 418 and the engine load 440 to the amount of background noise 432, as discussed further below. The noise storage module 436 may use interpolation to determine the amount of background noise 432 for values of the engine speed 418 and/or the engine load 440 that are between values in the mapping. The engine load 440 may refer to an amount (e.g., mass) of air per cylinder (APC) relative to a maximum APC of the engine 102. The APC may be determined, for example, based on MAF measured using the MAF sensor 186 and/or MAP measured using the MAP sensor 184.

The knock determination module 424 may determine the knock value 428 for the combustion event of the cylinder based on a ratio of the intensity value 420 to the amount of background noise 432. For example only, the knock determination module 424 may set the knock value 428 for the combustion event based on the intensity value 420 divided by the amount of background noise 432. The ratio of the intensity value 420 to the amount of background noise 432 may correspond to a signal to noise ratio as it may represent a ratio of vibration associated with knock to the amount of background noise 432.

A knock diagnostic module 444 selectively diagnoses occurrence of knock within the cylinder based on the knock value 428 and a predetermined knock value 448. For example, the knock diagnostic module 444 may diagnose knock in the cylinder when the knock value 428 is greater than the predetermined knock value 448. Conversely, the knock diagnostic module 444 may determine that knock is not occurring within the cylinder when the knock value 428 is less than the predetermined knock value 448. In various implementations, the knock diagnostic module 444 may diagnose knock in the cylinder when the knock value 428 has been greater than the predetermined knock value 448 for at least X out of the last Y combustion events of the cylinder, where Y is an integer greater than one, X is an integer greater than zero, and X is less than or equal to Y.

The knock diagnostic module 444 generates a knock signal 452 that indicates whether knock has been diagnosed in the cylinder. For example, the knock diagnostic module 444 may set the knock signal 452 to a first state when knock has been diagnosed in the cylinder and set the knock signal 452 to a second state when knock has not been diagnosed in the cylinder.

Referring back to FIG. 3, one or more engine operating parameters may be adjusted when knock is diagnosed in the cylinder. For example, the spark control module 324 may adjust the target spark timing 328 to retard the spark timing when knock is diagnosed in the cylinder. One or more other engine operating conditions may also be adjusted when knock is diagnosed, such as EGR, boost, throttle opening, fueling, etc. One or more other remedial actions may additionally or alternatively be taken when knock is diagnosed. For example only, one or more predetermined diagnostic trouble codes (DTCs) may be set in memory and a malfunction indicator lamp (MIL) may be illuminated.

Referring again to FIG. 4, a threshold determination module 456 determines the predetermined knock value 448 for the combustion event of the cylinder based on the engine speed 418 and the engine load 440. The threshold determination module 456 determines the predetermined knock value 448 using a mapping (e.g., table) that relates the engine speed 418 and the engine load 440 to the predetermined knock value 448. The threshold determination module 456 may use interpolation to determine the predetermined knock value 448 for values of the engine speed 418 and/or the engine load 440 that are between values in the mapping. The threshold determination module 456 may also apply one or more scalars to the predetermined knock value 448, as discussed further below. The predetermined knock value 448 may correspond to a predetermined ratio for intensity values to background noise above which may be deemed knock.

The noise storage module 436 may include two mappings that relate the engine speed 418 and the engine load 440 to the amount of background noise 432. A first one of the two mappings ("the first mapping") may be populated with predetermined values of the amount of background noise 432 calibrated by a vehicle manufacturer before sale. A second one of the two mappings is populated with values of the amount of background noise 432 learned during operation of the engine 102. The noise storage module 436 selects which one of the two mappings to use to determine the amount of background noise 432 as discussed further below.

A noise module 460 determines a learned amount of background noise 464 for an entry of the second mapping based on a plurality of the intensity values 420 generated for a plurality of combustion events of the cylinder during operation under the engine speed and engine load conditions corresponding to the entry. For example, the noise module 460 may determine the learned amount of background noise 464 for the entry of the second mapping based on an average of two or more of the intensity values 420 generated during operation under the corresponding engine speed and engine load conditions. The noise module 460 may limit the number of the intensity values 420 used to determine the learned amount of background noise 464 for an entry of the second mapping to a predetermined number of the most recent ones of the intensity values 420 generated under the corresponding engine speed and engine load conditions.

The noise module 460 determines a value of the learned amount of background noise 464 for each entry of the second mapping similarly. The noise module 460 stores the values of the learned amount of background noise 464 in the second mapping of the noise storage module 436 according to the engine speed and engine load conditions.

Even during operation under a set of engine speed and engine load conditions, however, the amount of background noise in the intensity values 420 may vary under some circumstances. For example, the amount of background noise may vary when the engine 102 is cold, when the engine 102 is hot, when multiple fuel injections are being used, when fueling to the engine 102 is rich, and/or when one or more cylinders are deactivated.

If the learned amount of background noise 464 for a given set of engine speed and engine load conditions is determined based on the intensity values 420 generated during operation under conditions where the amount of background noise is low, the knock diagnostic module 444 may incorrectly determine that knock is occurring later during use of the learned amount of background noise 464 during operation under different conditions where the amount of background noise is higher. Conversely, if the learned amount of background noise 464 for a given set of engine speed and engine load conditions is determined based on the intensity values 420 generated during operation under conditions where the amount of background noise is high, the knock diagnostic module 444 may not recognize knock that is occurring later during use of the learned amount of background noise 464 during operation under different conditions where the amount of background noise is lower.

The noise storage module 436 therefore stores an indicator of (present) conditions 468 with each entry of the second mapping. The indicator stored with a learned amount of background noise 464 in the second mapping indicates the conditions 468 under which that learned amount of background noise 464 was determined for the corresponding engine speed and engine load conditions.

Figure 5:
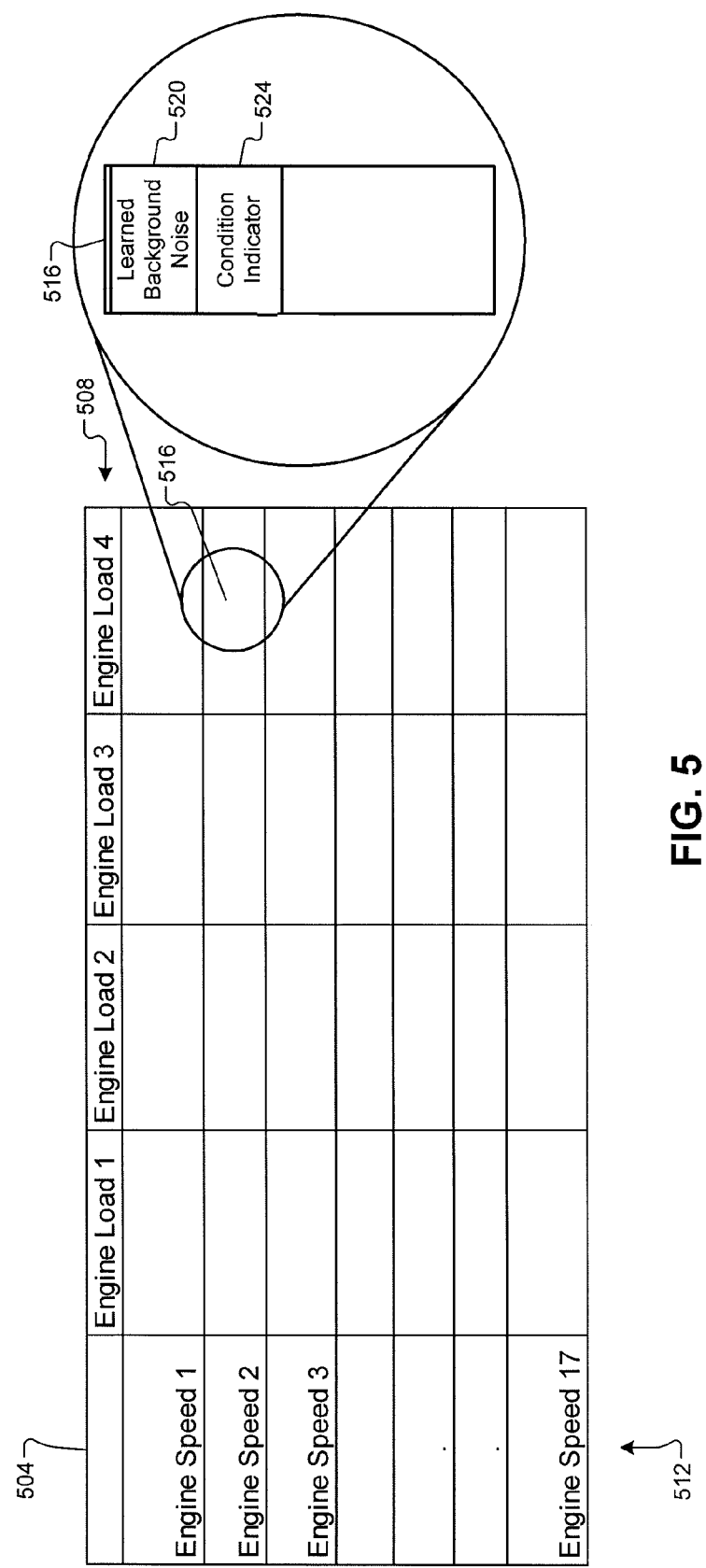
FIG. 5 is an example illustration of a mapping relating engine speed and engine load to amount of background noise according to the present disclosure.

FIG. 5 includes an example illustration of the second mapping 504. As described above, the second mapping includes entries for values of the learned background noise 464 indexed by engine load 508 and engine speed 512. Each entry corresponds to one of the engine loads 508 and one of the engine speeds 512. For example, entry 516 corresponds to a fourth one of the engine loads 508 and a second one of the engine speeds 512.

The entry 516 includes a value 520 of the learned background noise 464 corresponding to the fourth one of the engine loads 508 and the second one of the engine speeds 512. The entry 516 also includes a condition indicator 524 that indicates the conditions 468 (other than the engine speed 418 and the engine load 440) under which the value 520 was determined. While not shown, the entry 516 may also include other data.

Referring again to FIG. 4, a condition module 472 sets the conditions 468 based on one or more operating parameters. For example, the condition module 472 may set the conditions 468 to indicate: (1) whether an engine coolant temperature (ECT) 476 is greater than a first predetermined temperature; (2) whether the ECT 476 is less than a second predetermined temperature; (3) an ethanol content 480 of the fuel being supplied to the engine 102; (4) whether fuel is being provided to the engine 102 using multiple injections; (5) whether fueling of the engine 102 is richer than a stoichiometric mixture by at least a predetermined amount; (6) and whether one or more cylinders of the engine 102 are deactivated. In various implementations, (4) may include multiple individual determinations of whether multiple fueling injections are being used for different types of events, such as light-off of a catalyst or other fuel efficiency and/or emissions reasons. For example only, the conditions 468 may include results of (1)-(6) may be encoded in a predetermined manner to indicate the results of (1)-(6).

The ECT 476 may be measured using the ECT sensor 182. While use of the ECT 476 is discussed, another suitable engine temperature may be used. The condition module 472 may determine whether fueling is being supplied using multiple injections and whether fueling is richer than stoichiometry by at least the predetermined amount, for example, based on a fueling signal 484 from the fuel control module 332. The condition module 472 may determine whether one or more cylinders are deactivated, for example, based on an activation/deactivation signal 488 from the cylinder control module 340. The ethanol content 480 may be determined, for example, based on one or more cylinder pressures measured during combustion of the fuel, one or more engine speeds measured during combustion of the fuel, measured using a sensor, or obtained in another suitable manner. The first predetermined temperature is greater than the second predetermined temperature. The second predetermined temperature may be set based on a temperature below which a block portion of the engine 102 is considered cold. The first predetermined temperature may be set based on a temperature above which the block portion of the engine 102 is considered hot.

A condition storage module 492 may include stored indicators of which ones of (1)-(6), described above, the conditions 468 should be set to indicate. The indicators may be set, for example, by the vehicle manufacturer. For example, one or more of the indicators may be set such that the condition module 472 sets the conditions 468 independent of the corresponding one or more of (1)-(6) when changes in the condition(s) associated with (1)-(6) do not cause sufficient changes in background noise.

As stated above, the noise storage module 436 stores the conditions 468 with the learned amount of background noise 464 in the second mapping based on the engine speed 418 and the engine load 440. When one or more of the conditions 468 are different than the conditions stored with the learned amount of background noise 464 in the second mapping corresponding to the engine speed 418 and the engine load 440, a learning triggering module 494 triggers a relearning of the learned amount of background noise 464. Relearning of the learned amount of background noise 464 includes determining a new value of the learned amount of background noise 464 for the conditions 468 based on a plurality of new ones of the intensity values 420. The difference between the conditions 468 and the stored conditions may indicate that the background noise may be different than the learned amount of background noise 464 stored in the second mapping. This difference may affect the knock diagnostic module 444's ability to accurately diagnose whether knock is occurring.

The learning triggering module 494 may trigger a relearning via a trigger signal 496. When a relearning is triggered, the noise storage module 436 may determine the amount of background noise 432 based on the engine speed 418 and the engine load 440 using the first mapping. The noise storage module 436 may determine the amount of background noise 432 using the first mapping until the noise module 460 has received a predetermined number of the intensity values 420 (for the predetermined number of combustion events of the cylinder) for determining the new value of the learned amount of background noise 464. For example only, the predetermined number may be 2 or 3, corresponding to 2 or 3 combustion events.

Once the predetermined number of the intensity values 420 have been received, the noise module 460 determines the learned amount of background noise 464 based on the predetermined number of the intensity values 420. The noise storage module 436 stores the learned amount of background noise 448F and the conditions 468 in the second mapping based on the engine speed 418 and the engine load 440 for use as the amount of background noise 432 when the conditions 468 are present in the future.

The threshold determination module 456 may apply one or more scalars to the predetermined knock value 448 while amount of background noise 432 is being determined using the first mapping and after the predetermined number of the intensity values 420 have been received. The scalars may reduce the likelihood of the knock diagnostic module 444 diagnosing that knock occurred due to inaccuracy in the amount of background noise 432 shortly after a relearning is triggered. The threshold determination module 456 may reduce the effect of the scalar(s) over time, for example, as more of the intensity values 420 are received and, therefore, accuracy of the learned amount of background noise 464 increases.

Figure 6:
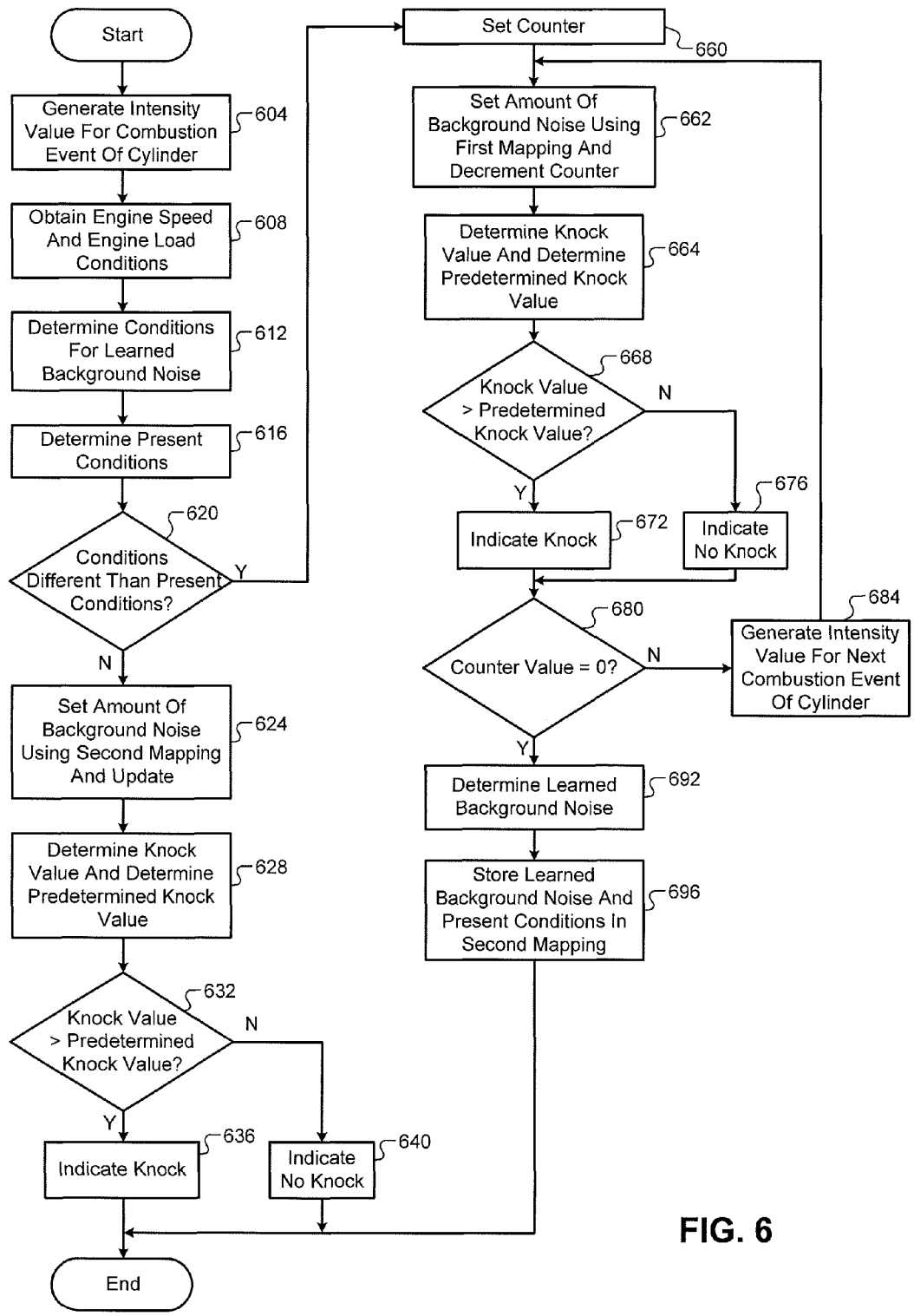
FIG. 6 is a flowchart depicting an example method of diagnosing whether knock is occurring and selectively relearning an amount of background noise according to the present disclosure.

Referring now to FIG. 6, a flowchart depicting an example method of diagnosing whether knock is occurring and selectively relearning an amount of background noise is presented. Control may begin with 604 where the DSP module 412 generates the intensity value 420 for a combustion event of a cylinder. The DSP module 412 generates the intensity value 420 for the combustion event based on vibration measured using a vibration sensor during the knock window of the cylinder. At 608, the learning triggering module 494 obtains the engine speed 418 and the engine load 440.

The learning triggering module 494 determines the conditions associated with the learned amount of background noise stored in the second mapping corresponding to the engine speed 418 and the engine load 440 at 612. The learning triggering module 494 retrieves the conditions from the second mapping based on the engine speed 418 and the engine load 440.

At 616, the condition module 472 generates the (present) conditions 468. The condition module 472 may set the conditions 468 to indicate one or more of: (1) whether the ECT 476 is greater than the first predetermined temperature; (2) whether the ECT 476 is less than the second predetermined temperature; (3) the ethanol content 480 of the fuel being supplied to the engine 102; (4) whether fuel is being provided to the engine 102 using multiple injections; (5) whether fueling of the engine 102 is richer than a stoichiometric mixture by at least the predetermined amount; and (6) whether one or more cylinders of the engine 102 are deactivated.

At 620, the learning triggering module 494 determines whether the conditions 468 are different than the conditions retrieved from the second mapping. If 620 is true, the learning triggering module 494 triggers a relearning (of the entry of the second mapping corresponding to the engine speed 418 and the engine load 440) and control transfers to 660, which is discussed further below. If 620 is false, control continues with 624. If the conditions 468 are different than the conditions retrieved from the second mapping, the actual amount of background noise present may be different than the learned amount of background noise stored in the second mapping. This difference may prevent the knock diagnostic module 444 from identifying knock when knock is present or cause the knock diagnostic module 444 to identify knock when knock is not present.

At 624, the noise storage module 436 determines the amount of background noise 432 from the second mapping based on the engine speed 418 and the engine load 440. As discussed above, the second mapping relates engine speeds and engine loads to learned amounts of background noise. The noise module 460 may also update the learned amount of background noise in the second mapping corresponding to the engine speed 418 and the engine load 440 based on the intensity value 420 at 624.

The knock determination module 424 determines the knock value 428 for the combustion event of the cylinder at 628 based on the intensity value 420 of the combustion event and the amount of background noise 432. For example only, the knock determination module 424 may set the knock value 428 equal to or based on the intensity value 420 divided by the amount of background noise 432. The threshold determination module 456 also determines the predetermined knock value 448 for the combustion event at 628. The threshold determination module 456 determines the predetermined knock value 448 based on the engine speed 418 and the engine load 440 using a mapping that relates engine speeds and engine loads to predetermined knock values.

At 632, the knock diagnostic module 444 determines whether knock occurred in the cylinder based on the knock value 428 for the combustion event and the predetermined knock value 448 for the combustion event. For example, the knock diagnostic module 444 may determine whether the knock value 428 is greater than the predetermined knock value 448 at 632. If 632 is true, the knock diagnostic module 444 may indicate that knock occurred within the cylinder at 636, and control may end. If 632 is false, the knock diagnostic module 444 may indicate that knock did not occur within the cylinder at 640, and control may end.

One or more remedial actions may be taken when knock is diagnosed. For example only, the spark control module 324 may retard the spark timing when knock is diagnosed. Boost, EGR, throttle opening, and/or one or more other engine operating parameters may additionally or alternatively be adjusted when knock is diagnosed. One or more DTCs may be set in memory and the MIL lamp may also be illuminated when knock is diagnosed.

Referring now to 660 (when the conditions 468 are different than the conditions retrieved from the second mapping), the noise module 460 may set a counter value to a predetermined value. For example only, the predetermined value may be 2 or 3. The predetermined value corresponds to a number of the intensity values 420 used to determine a new value of the learned amount of background noise 464 for the engine speed 418, the engine load 440, and the conditions 468.

The noise storage module 436 determines the amount of background noise 432 from the first mapping based on the engine speed 418 and the engine load 440 at 662. As discussed above, the first mapping relates engine speeds and engine loads to predetermined amounts of background noise. The noise module 460 may also decrement the counter value at 662.

At 664, the knock determination module 424 determines the knock value 428 for the combustion event of the cylinder at 628 based on the intensity value 420 of the combustion event and the amount of background noise 432. For example only, the knock determination module 424 may set the knock value 428 equal to or based on the intensity value 420 divided by the amount of background noise 432. The threshold determination module 456 also determines the predetermined knock value 448 for the combustion event at 664. The threshold determination module 456 determines the predetermined knock value 448 based on the engine speed 418 and the engine load 440 using the mapping that relates engine speeds and engine loads to predetermined knock values.

The knock diagnostic module 444 determines whether knock occurred in the cylinder based on the knock value 428 for the combustion event and the predetermined knock value 448 for the combustion event at 668. For example, the knock diagnostic module 444 may determine whether the knock value 428 is greater than the predetermined knock value 448 at 668. If 668 is true, the knock diagnostic module 444 may indicate that knock occurred within the cylinder at 672, and control may continue with 680. If 668 is false, the knock diagnostic module 444 may indicate that knock did not occur within the cylinder at 676, and control may continue with 680. As discussed above, one or more remedial actions may be taken when knock is diagnosed, such as retarding spark timing, adjusting boost, EGR, throttle opening, and/or one or more other engine operating parameters, setting one or more DTCs in memory, and/or illuminating the MIL lamp.

At 680, the noise module 460 may determine whether the value of the counter is equal to zero. If 680 is false, control may continue with 684. If 680 is true, control may continue with 692. While setting the counter to the predetermined value, decrementing the counter, and comparing the counter value to zero are described, setting the counter value to zero, incrementing the counter value, and comparing the counter value to the predetermined value may be used.

At 684, the DSP module 412 generates the intensity value 420 for the next combustion event based on vibration measured using the vibration sensor during the knock window of the next combustion event of the cylinder, and control returns to 662 to continue use of the first mapping during the relearning.

At 692, when the counter value is equal to zero, the noise module 460 determines the learned amount of background noise 464 for the engine speed 418, the engine load 440, and the conditions 468. The noise module 460 determines the learned amount of background noise 464 based on the predetermined number of the intensity values 420 determined during the last predetermined number of combustion cycles of the cylinder. For example, the noise module 460 may set the learned amount of background noise 464 equal to or based on an average of those intensity values 420.

At 696, the noise storage module 436 stores the learned amount of background noise 464 and the conditions 468 in the entry of the second mapping corresponding to the engine speed 418 and the engine load 440, and control may end. The threshold determination module 456 may also apply the scalar(s) to the predetermined knock value 448 at 696. The threshold determination module 456 may reduce the effect of the scalar(s) as more of the intensity values 420 (of future combustion events of the cylinder at approximately the engine speed 418 and the engine load 440) are used to determine the learned amount of background noise. While control is shown and discussed as ending, FIG. 6 may return to 604 for a next combustion event of the cylinder. Control loops may be performed for each cylinder of the engine 102.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An engine control system of a vehicle, comprising:
   a condition module that generates an indicator of present operating conditions of an engine based on an engine temperature, fueling of the engine, an amount of ethanol in the fuel, and a number of deactivated cylinders of the engine;
   a noise module that determines a first amount of noise based on vibration measured during a first plurality of combustion events of a cylinder and that stores (i) the first amount of noise and (ii) a first value of the indicator of the present operating conditions in an entry of a mapping corresponding to a first engine speed and a first engine load;
   a triggering module that determines the first value of the indicator of the present operating conditions from the entry of the mapping based on a present engine speed and a present engine load corresponding to the first engine speed and the first engine load and that generates a trigger signal when the first value of the indicator of the present operating conditions is different than a second value of the indicator of the present operating conditions,
   wherein, when the trigger signal is generated, the noise module further:
      determines a second amount of noise based on vibration measured during a second plurality of combustion events of the cylinder occurring after the first plurality of combustion events; and
      replaces (i) the first amount of noise and (ii) the first value of the indicator of the present operating conditions in the entry of the mapping with (i) the second amount of noise and (ii) the second value of the indicator of the present operating conditions; and
   a spark control module that selectively retards spark timing based on the second amount of noise.

2. The engine control system of claim 1 further comprising:
   a knock determination module that determines a knock value for a combustion event of the cylinder occurring after the second plurality of combustion events based on vibration measured during the combustion event of the cylinder and based on the second amount of noise; and
   a knock diagnostic module that selectively diagnoses knock in the cylinder based on the knock value and a predetermined knock value.

3. The engine control system of claim 2 wherein the spark control module retards a spark timing when knock is diagnosed.

4. The engine control system of claim 2 wherein the knock diagnostic module diagnoses knock in the cylinder when the knock value is greater than the predetermined knock value.

5. The engine control system of claim 2 wherein the knock determination module sets the knock value for the combustion event based on an intensity of the vibration measured during the combustion event of the cylinder divided by the second amount of noise.

6. The engine control system of claim 1 wherein the condition module generates the indicator of the present operating conditions based on whether the engine temperature is less than a predetermined temperature.

7. The engine control system of claim 1 wherein the condition module generates the indicator of the present operating conditions based on whether the engine temperature is greater than a predetermined temperature.

8. The engine control system of claim 1 wherein the condition module generates the indicator of the present operating conditions based on whether at least one cylinder of the engine is deactivated.

9. The engine control system of claim 1 further comprising a fuel control module that selectively provides fuel for a combustion event of the cylinder occurring after the plurality of combustion events using at least two fuel injections, wherein the condition module generates the indicator of the present operating conditions based on whether fuel is being provided to the cylinder using at least two fuel injections.

10. The engine control system of claim 1 wherein the condition module generates the indicator of the present operating conditions based on whether the fueling of the engine is richer than stoichiometry by at least a predetermined amount.

11. An engine control method for a vehicle, comprising:
generating an indicator of present operating conditions of an engine based on an engine temperature, fueling of the engine, an amount of ethanol in the fuel, and a number of deactivated cylinders of the engine;
determining a first amount of noise based on vibration measured during a first plurality of combustion events of a cylinder;
storing (i) the first amount of noise and (ii) a first value of the indicator of the present operating conditions in an entry of a mapping corresponding to a first engine speed and a first engine load;
determining the first value of the indicator of the present operating conditions from the entry of the mapping based on a present engine speed and a present engine load corresponding to the first engine speed and the first engine load;
generating a trigger signal when the first value of the indicator of the present operating conditions is different than a second value of the indicator of the present operating conditions;
when the trigger signal is generated:
determining a second amount of noise based on vibration measured during a second plurality of combustion events of the cylinder occurring after the first plurality of combustion events; and
replacing (i) the first amount of noise and (ii) the first value of the indicator of the present operating conditions in the entry of the mapping with (i) the second amount of noise and (ii) the second value of the indicator of the present operating conditions; and
selectively retarding spark timing based on the second amount of noise.

12. The engine control method of claim 11 further comprising:
determining a knock value for a combustion event of the cylinder occurring after the second plurality of combustion events based on vibration measured during the combustion event of the cylinder and based on the second amount of noise; and
selectively diagnosing knock in the cylinder based on the knock value and a predetermined knock value.

13. The engine control method of claim 12 wherein selectively retarding spark timing includes retarding the spark timing when knock is diagnosed.

14. The engine control method of claim 12 further comprising diagnosing knock in the cylinder when the knock value is greater than the predetermined knock value.

15. The engine control method of claim 12 further comprising setting the knock value for the combustion event based on an intensity of the vibration measured during the combustion event of the cylinder divided by the second amount of noise.

16. The engine control method of claim 11 further comprising generating the indicator of the present operating conditions based on whether the engine temperature is less than a predetermined temperature.

17. The engine control method of claim 11 further comprising generating the indicator of the present operating conditions based on whether the engine temperature is greater than a predetermined temperature.

18. The engine control method of claim 11 further comprising generating the indicator of the present operating conditions based on whether at least one cylinder of the engine is deactivated.

19. The engine control method of claim 11 further comprising:
selectively providing fuel for a combustion event of the cylinder occurring after the plurality of combustion events using at least two fuel injections; and
generating the indicator of the present operating conditions based on whether fuel is being provided to the cylinder using at least two fuel injections.

20. The engine control method of claim 11 further comprising generating the indicator of the present operating conditions based on whether the fueling of the engine is richer than stoichiometry by at least a predetermined amount.

* * * * *